Patented Feb. 14, 1928.

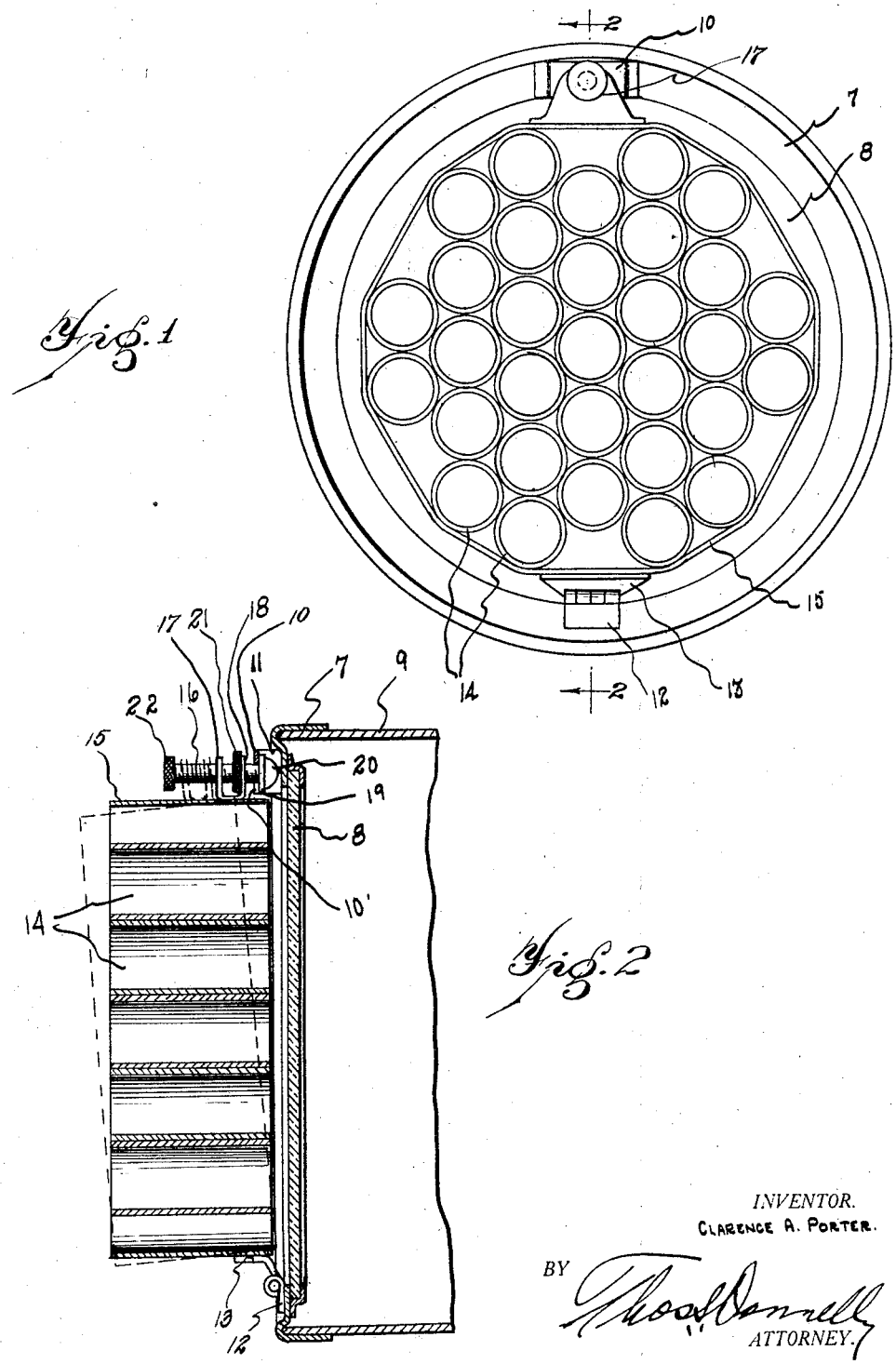

1,659,409

UNITED STATES PATENT OFFICE.

CLARENCE A. PORTER, OF DETROIT, MICHIGAN.

LIGHT DEFLECTOR.

Application filed October 26, 1925. Serial No. 64,825.

My invention relates to a new and useful improvement in a light deflector, adapted for use with vehicle headlights and intended to prevent the glare from the vehicle headlights, so that the driver of an approaching vehicle will not have his vision impaired.

Another object of the invention is the provision of a deflector of this class which will be simple in structure, economical of manufacture and highly efficient in use.

Another object of the invention is the provision of a plurality of tubular members arranged together and tiltable relatively to the headlight upon which mounted, so that the rays of light may be deflected downwardly, when desired.

Other objects will appear hereinafter.

The invention consists in the combination and arrangement of parts hereinafter described and claimed.

The invention will be best understood from a reference to the accompanying drawings, which form a part of this specification and in which, Fig. 1 is a front elevational view of the invention, Fig. 2 is a sectional view taken on substantially line 2—2 of Fig. 1.

As shown in the drawings, the invention is adapted for mounting on a rim 7, which is customarily mounted upon a vehicle headlight 9, in which a transparent lens 8 is mounted. A supporting bracket 10, formed preferably from metal, is mounted on the exterior surface of the rim 7, preferably at the top thereof. As shown in Fig. 2, the ends of the bracket are angularly turned, so as to retain the main body of the bracket in spaced relation to the rim 7. A vertically extending slot 10' is formed in the under side of the bracket 10.

Mounted upon the rim 7 at the lower side thereof is a knuckle bearing portion 12 cooperating with which, in a hinged manner, is a knuckle bearing portion 13, which is secured by soldering, welding, or in any other suitable manner, to a band 15, which is projected around the tubular deflecting members 14. These deflecting members are, as shown in Fig. 2, of greater length than their diameter, and are secured to adjacent tubes at their points of contact, by soldering, welding, or in any other suitable manner. A screw 16 is projected through threaded openings formed in the legs 17 and 18 of a U-shaped clip, which is secured to the band 15 at the upper side thereof, a lock nut 21 being threaded on the screw 16 between the legs 17 and 18. Formed on the screw 16 is a head 19 which engages the bracket 10 lying between the rim 7 and the bracket 10, the screw 16 engaging in the slot 10'. Mounted on the head 19 and adapted to engage against the rim 7 is a tip 20 made from rubber or other suitable material to assist in preventing rattling of these parts. The screw 16 is provided with the knurled head 22.

In operation, the light directed from the headlight 9 will be projected through the tubular members 14. It is desirable to have these tubular members 14 of greater length than their diameter so that rays of light proceeding at an angle upwardly inclined from the headlight 9 will be prevented from passing directly from the headlight and will be reflected from the inner surface of the tubular member 14 and deflected in a forwardly extending plane.

For highly efficient results, the inner surfaces of the tubular members 14 may be burnished. It is thus apparent that when the tubular members 14 extend horizontally, the majority of the rays of light proceeding from the headlight 9 will be directed into horizontal planes. On account of the secure arrangement by threading the screw 16, the tubular members 14 may be tilted downwardly, as shown in dotted lines in Fig. 2, thus directing the rays of light forwardly from the headlight 9 in a downwardly inclined direction so that the road in front of the vehicle will be illuminated, without directing the rays of light too great a distance forwardly of the vehicle. It is evident that on account of the secure arrangement, various degrees of adjustment may be had in this regard, so that the point of direction of the rays of light downwardly may be adjusted to a very fine degree, depending upon the wishes of the driver of the vehicle with which the invention is used.

It is believed evident that the tubular members may be formed separately and connected together as shown, or that the tubular members may be formed from sheets of metal laid together in co-operating positions. The specific form of the invention in this regard is a matter of detail which will be determined largely by the mechanic producing the same.

While I have illustrated and described the preferred form of structure, I do not wish to limit myself to the precise form of structure shown, but desire to avail myself of such variations and modifications as come within the scope of the appended claim.

Having thus described my invention, what I claim as new and desire to secure by Letters Patent is:

In a light deflecting device of the class described adapted for use with a headlight having a rim mounted thereon, comprising: a deflecting member comprising a plurality of tubes; a band on said deflecting member for binding said tubes together with their peripheries in engagement; a bracket mounted on said rim; a U-shaped clip mounted on said band having aligning interiorly threaded openings formed in its legs; means for swingably mounting said band on said rim at a point diametrically opposite said U-shaped clip; a screw mounted on said bracket and threaded into said openings, the threading of said screw effecting a swingable movement of said deflecting member relatively to said rim; and a locking nut threaded on said screw, intermediate the legs of said clip for locking said screw against rotation.

In testimony whereof, I have signed the foregoing.

CLARENCE A. PORTER.